United States Patent
Lin

(10) Patent No.: US 11,353,958 B2
(45) Date of Patent: Jun. 7, 2022

(54) INTERACTIVE ATTRACTION SYSTEM AND METHOD FOR OBJECT AND USER ASSOCIATION

(71) Applicant: Universal City Studios LLC, Universal City, CA (US)

(72) Inventor: Yu-Jen Lin, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 17/216,173

(22) Filed: Mar. 29, 2021

(65) Prior Publication Data

US 2021/0216139 A1 Jul. 15, 2021

Related U.S. Application Data

(63) Continuation of application No. 16/561,812, filed on Sep. 5, 2019, now Pat. No. 10,976,818.

(60) Provisional application No. 62/889,957, filed on Aug. 21, 2019.

(51) Int. Cl.
| | |
|---|---|
| *G06F 3/01* | (2006.01) |
| *G06T 7/70* | (2017.01) |
| *G06T 7/20* | (2017.01) |
| *G06V 10/20* | (2022.01) |
| *G06V 20/20* | (2022.01) |
| *G06V 40/20* | (2022.01) |
| *G06V 40/16* | (2022.01) |

(52) U.S. Cl.
CPC ................ *G06F 3/014* (2013.01); *G06T 7/20* (2013.01); *G06T 7/70* (2017.01); *G06V 10/255* (2022.01); *G06V 20/20* (2022.01); *G06V 40/171* (2022.01); *G06V 40/28* (2022.01)

(58) Field of Classification Search
CPC ..... G06F 3/014; G06F 3/017; G06K 9/00355; G06K 9/00281; G06K 9/3241; G06K 9/00671; G06K 2009/3291; G06K 9/00335; G06T 7/70; G06T 7/20; A63G 31/16; A63G 31/00; A63F 13/213
See application file for complete search history.

(56) References Cited

U.S. PATENT DOCUMENTS

| | | |
|---|---|---|
| 6,176,837 B1 | 1/2001 | Foxlin |
| 6,784,826 B2 | 8/2004 | Kane et al. |
| 8,144,118 B2 | 3/2012 | Hildreth |
| 8,334,842 B2 | 12/2012 | Markovic et al. |
| 8,760,398 B2 | 6/2014 | Pryor |
| 8,795,077 B1 | 8/2014 | Musick, Jr. et al. |

(Continued)

OTHER PUBLICATIONS

PCT/US2020/047248 International Search Report and Written Opinion dated Nov. 9, 2020.

*Primary Examiner* — Rodney Amadiz
(74) *Attorney, Agent, or Firm* — Fletcher Yoder, P.C.

(57) ABSTRACT

A system of an amusement park attraction includes an optical sensor configured to detect light and provide optical data based on the detected light and a controller having circuitry communicatively coupled to the optical sensor. The controller is configured to receive the optical data, process the optical data to detect a first movement of a user and a second movement of a handheld or wearable object, detect a correlation between the first movement and the second movement, and associate the handheld or wearable object with the user based on the correlation.

20 Claims, 4 Drawing Sheets

(56) References Cited

U.S. PATENT DOCUMENTS

| | | | |
|---|---|---|---|
| 9,275,337 B2 * | 3/2016 | Turgeman | G06F 3/033 |
| 9,541,995 B2 * | 1/2017 | Turgeman | G06F 21/36 |
| 9,805,233 B2 | 10/2017 | Sample et al. | |
| 9,876,891 B2 | 1/2018 | Björklund | |
| 10,525,335 B2 * | 1/2020 | Mikhailov | A63F 13/5255 |
| 10,599,920 B2 * | 3/2020 | Mojaver | G06F 3/017 |
| 10,657,367 B2 * | 5/2020 | Fei | G06V 40/28 |
| 2005/0143173 A1 | 6/2005 | Barney et al. | |
| 2009/0234666 A1 | 9/2009 | Crawford et al. | |
| 2010/0199228 A1 | 8/2010 | Latta et al. | |
| 2011/0317871 A1 | 12/2011 | Tossell et al. | |
| 2014/0009384 A1 | 1/2014 | Valik et al. | |
| 2014/0240102 A1 | 8/2014 | Kawash et al. | |
| 2015/0145671 A1 | 5/2015 | Cohen et al. | |
| 2016/0379074 A1 | 12/2016 | Nielsen et al. | |
| 2018/0253141 A1 | 9/2018 | McCracken | |
| 2019/0086996 A1 | 3/2019 | Bahrami et al. | |
| 2019/0220635 A1 | 7/2019 | Yeh et al. | |

\* cited by examiner

INTERACTIVE ATTRACTION SYSTEM AND METHOD FOR OBJECT AND USER ASSOCIATION

CROSS REFERENCE TO RELATED APPLICATIONS

This application is a continuation of U.S. patent application Ser. No. 16/561,812, entitled "Interactive Attraction System and Method for Object and User Association," filed Sep. 5, 2019, which claims priority to and the benefit of U.S. Provisional Application Ser. No. 62/889,957, entitled "Interactive Attraction System and Method for Object and User Association," filed Aug. 21, 2019, all of which are herein incorporated by reference in their entireties for all purposes.

BACKGROUND

The disclosure relates generally to an interactive amusement park attraction and, specifically, techniques for associating a handheld or wearable object with a user.

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

Amusement parks and other entertainment venues use a variety of features to entertain guests. For example, an amusement park may include various rides, such as a roller coaster, a drop tower, a log flume, and so forth, which provide unique experiences for the guests. Additionally, the amusement park may include various other features, such as performance shows, special effects, and decorations to immerse guests in an environment. As amusement parks become increasingly popular, there is an increase in expectation among patrons for improved and more creative features. For example, guests may desire features that react or respond with various guest interactions. However, implementation of interactive features may be complex and difficult.

BRIEF DESCRIPTION

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system of an amusement park attraction includes an optical sensor configured to detect light and provide optical data based on the detected light and a controller having circuitry communicatively coupled to the optical sensor. The controller is configured to receive the optical data, process the optical data to detect a first movement of a user and a second movement of a handheld or wearable object, detect a correlation between the first movement and the second movement, and associate the handheld or wearable object with the user based on the correlation.

In an embodiment, a controller for an attraction system includes a non-transitory computer readable medium storing executable instructions that, when executed by a processor of the controller, are configured to cause the processor to receive optical data from an optical sensor of the attraction system, detect a first movement of a user based on the optical data, detect a second movement of a handheld or wearable object based on the optical data, determine a correlation between the first movement and the second movement, and associate the handheld or wearable object with the user based on the correlation between the first movement and the second movement.

In an embodiment, an attraction system of an amusement park includes an optical sensor configured to detect light and provide optical data based on the detected light. The attraction system also includes a database configured to store data associated with the attraction system and a controller communicatively coupled to the optical sensor and to the database. The controller is configured to receive the optical data, process the optical data to detect a first movement of a user and a second movement of an object, detect a correlation between the first movement and the second movement, associate the object with the user based on the correlation, identify an interaction associated with the object based on the first movement and the second movement, and update the database in response to determining the interaction.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
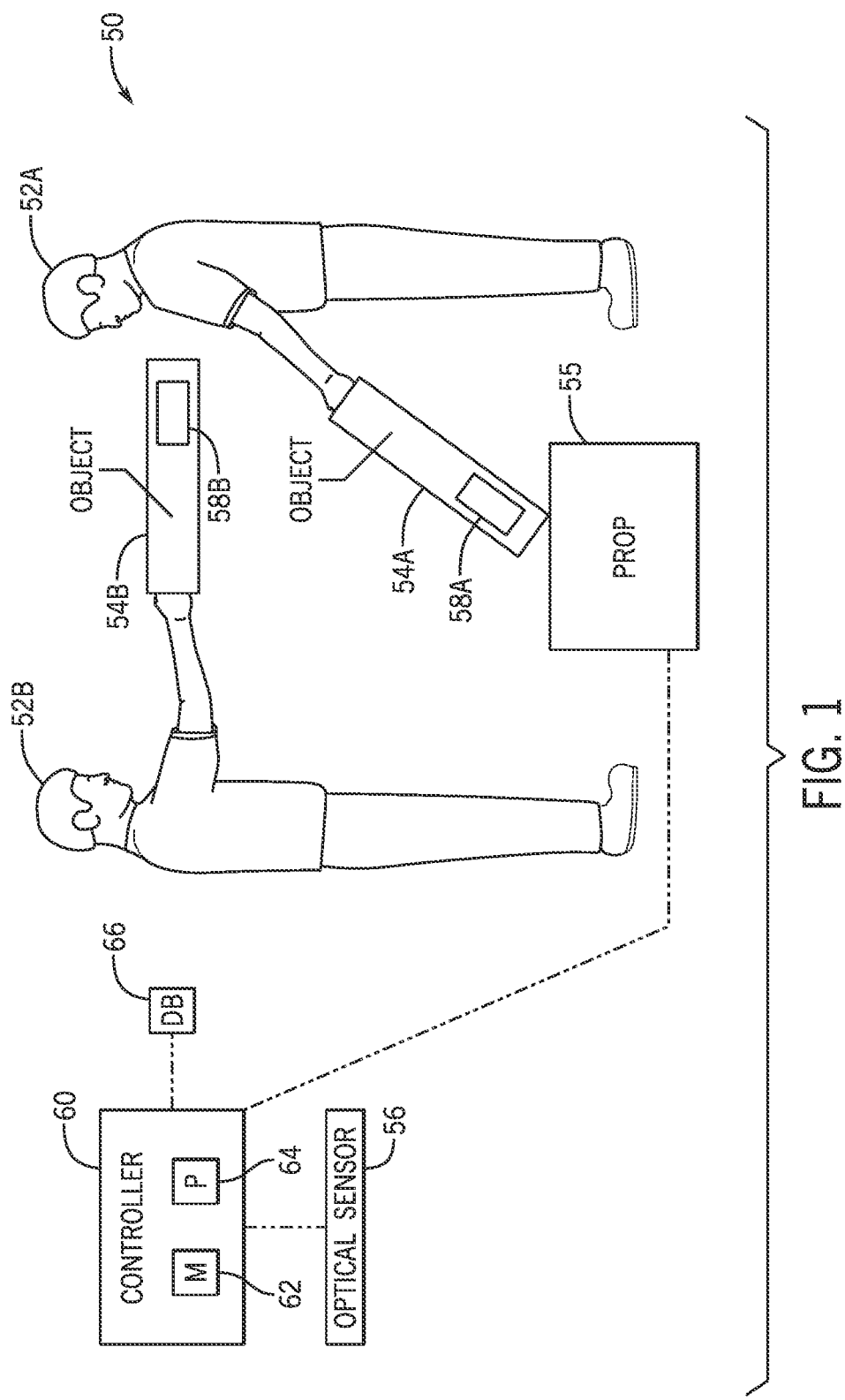
FIG. 1 is a schematic view of an interactive attraction system configured to detect movement of users and objects, in accordance with an embodiment of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure is directed to systems and methods that utilize movement of a user and of an object to determine whether the user and the object are associated with one another. In an implementation, the disclosed techniques are provided within an entertainment venue, such as an amusement or theme park. As such, the described techniques may be used to entertain guests with a more personalized experience based on the associated objects so as to provide a more interactive environment to the guests. In an additional or an alternative implementation, the techniques described herein may be used in other settings.

Amusement parks and other entertainment venues provide a variety of features to entertain guests. For example, an amusement park may employ various attraction systems, such as rides and shows, and immersive environmental settings, such as special effects and stage props. The amusement park may also provide features with which guests may interact. For example, each guest of the amusement park may interact with various features of the amusement park, such as animated figures. Such interactions may activate certain special effects, such as movement of the animated figure, thereby providing the guests with an interactive experience.

However, it may be desirable to provide the guests with a more personalized, interactive experience. In other words, interactions between features of the amusement park and of the guests may be unique to each guest. For instance, an interaction between a first guest and a feature may result in a first update (e.g., activation of a first set of special effects) of the feature. An interaction between a second guest and the same features may result in a second update (e.g., activation of a second set of special effects) of the feature. As a result, each guest experiences a unique and personalized interaction. It may also be desirable (or necessary for providing personalization) to distinguish a first object of a first guest from a second object of a second guest situated in an overlapping visual space. Accordingly, the disclosed embodiments facilitate identifying such distinctions by correlating movements of a guest with movements of a handheld or wearable object based on coordination of movement of the guest and movement of the object. The handheld or wearable nature of the object may facilitate physical features and movements of the user to drive the movement of the object.

To this end, the present disclosure is directed to techniques to associate a guest with a corresponding object possessed by the guest to link the guest with actions performed via the object. In an embodiment, the guest may use their possessed object to interact with various features of the amusement park, such as props or other guests. Based on a determined interaction of the guest via their possessed object and of the guest, a unique event may occur, thereby providing the guest with a personalized experience. Systems and methods described in the present disclosure include an accurate manner to associate a guest with an object based on respective movements of the guest and of the object. As an example, it may be determined whether the movement of the guest is causing the movement of the object, thereby indicating that the guest is possessing and associated with the object. In this manner, the guest may be accurately linked with the object, and a unique experience may be provided based on the guest, the object, and/or an action performed by the guest using the object.

With this in mind, FIG. 1 is a schematic view of an embodiment of an interactive attraction system 50 of an amusement park. As used herein, the attraction system 50 may include a space where users 52 (e.g., amusement park guests) may participate and interact with various features of the attraction system 50. In an implementation, the attraction system 50 may include an enclosure or a boundary (physical or virtual) within which the users 52 are contained. Additionally or alternatively, the attraction system 50 may have an open space where the users 52 may freely roam. Each user 52 may possess a respective object 54, which may be a handheld object or device (e.g., a foam sword) that is gripped in a hand of the user 52. Each user 52 may use their respective object 54 to perform an action within the context of the attraction system 50. Based on the action performed and detection of this action, a feature of the attraction system 50 may update. By way of example, a first user 52A may possess a first object 54A and may point the first object 54A at a prop 55 of the attraction system 50. In response, certain special effects (e.g., lighting, audio) may be effectuated to reflect the performed action. Furthermore, a second user 52B may possess a second object 54B and may point the second object 54B at the first user 52A. Accordingly, another feature of the attraction system 50 may be updated (e.g., additional special effects may be effectuated). In a certain embodiment, the feature may update based on the particular user 52 and/or the particular object 54 performing the action. That is, for instance, a first feature may update upon the first user 52A pointing the first object 54A at the prop 55. However, a second, different feature may update upon the second user 52B pointing the second object 54B at the prop 55, even though the second user 52B may point at the prop 55 with the second object 54B in a similar manner in which the first user 52A pointed at the prop 55 with the first object 54A. As such, the experience provided by the attraction system 50 is more personalized to each particular user 52. It should be noted that pointing is just one example of gestures that may be identified in accordance with present embodiments. Additional or alternative gestures may also include contacting certain features (e.g., the prop 55) with an object 54, moving the object 54 in a particular motion (e.g., to form a geometric shape), and the like.

Within a limited space, it may be difficult to use sensors (e.g., cameras) to discern which user 52A, 52B is controlling a particular one of the objects 54A, 54B because of overlapping visual data. Accordingly, the attraction system 50 is configured to associate each object 54 with the corresponding user 52 possessing the object 54, thereby enabling the attraction system 50 to determine the actions performed by each user 52 as related to the respective objects 54. In one embodiment, the attraction system 50 may use machine vision or imaging techniques to correlate each object 54 with the respective user 52. For instance, the attraction system 50 may include an optical sensor 56 configured to detect light.

The optical sensor 56 may include an infrared camera, a red, green, blue (RGB) camera, a depth sensor, another suitable type of optical sensor 56, or any combination thereof. Further, the optical sensor 56 may include multiple sensors or components. For example, the optical sensor 56 may include a filtered sensor configured to capture a specific range infrared light and a sensor for detecting visible light. The optical sensor 56 may be able to capture an image or model of the users 52, such as via skeletal tracking. Additionally, the optical sensor 56 may be able to capture an image of at least a portion of the objects 54. In an embodiment, each object 54 may include a respective reference element 58 that is trackable to the optical sensor 56 and enables the optical sensor 56 to detect the objects 54 more clearly and accurately. The reference element 58 may be or include a light reflector that enables the optical sensor 56 (e.g., using a filter) to more definitively capture the reflected light for determining the position of the reference element 58. However, the reference element 58 may include any other suitable component that enables the optical sensor 56 to detect the object 54, such as an emitter configured to output a signal that is received by the optical sensor 56. In this way, the optical sensor 56 may distinguish the object 54 more clearly from other features within the attraction system 50, such as from other components that may reflect or direct light toward the optical sensor 56, thereby enabling the optical sensor 56 to track the reference element 58 and the object 54 more accurately. In an embodiment, the reference element 58 may be coupled to the object 54, such as via a fastener and/or an adhesive. In an additional or an alternative embodiment, the reference element 58 may be integrally formed with the object 54, such as via welding and/or molding.

The attraction system 50 may also include a controller 60 having a memory 62 and a processor 64. The memory 62 may include volatile memory, such as random access memory (RAM), and/or non-volatile memory, such as read-only memory (ROM), optical drives, hard disc drives, solid-state drives, or any other non-transitory computer-readable medium that includes instructions to operate the attraction system 50. The processor 64 may be configured to execute such instructions. For example, the processor 64 may include one or more application specific integrated circuits (ASICs), one or more field programmable gate arrays (FPGAs), one or more general purpose processors, or any combination thereof. The controller 60 may also include circuitry communicatively coupled to the optical sensor 56 to enable the controller 60 to receive optical data transmitted by the optical sensor 56. The optical data is based on detected light and may include image data taken by the optical sensor 56. The image data is indicative of the positioning of the users 52 and the objects 54 (e.g., the reference elements 58 of the objects 54). The controller 60 may process the optical data, such as to use the image data and determine the positioning (e.g., movement, position, orientation) of the users 52 and of the objects 54. Thus, the optical sensor 56 and the controller 60 may cooperate to track the positioning of the users 52 and of the object 54.

In an example embodiment, the controller 60 may also be communicatively coupled to a database 66, such as a cloud database and/or a local database, configured to store data. The database 66 may store information regarding each user 52. By way of example, the database 66 may include a user profile associated with each user 52, and the controller 60 may update each user profile based on detected actions performed by the corresponding user 52 (e.g., with the corresponding objects 54 and/or to the prop 55). For instance, in response to determining the first user 52A has pointed to the prop 55 with the first object 54A, the controller 60 may assign a first point value to a first user profile associated with the first user 52A. Similarly, in response to determining the second user 52B has pointed to the prop 55 with the second object 54B, the controller 60 may assign a second point value to a second user profile associated with the second user 52B. Additionally, the controller 60 may also assign a third point value (e.g., a negative point value) to the first user profile upon determining the first user 52A has been contacted with the second object 54B of the second user 52B. As each user 52 performs a respective action, the controller 60 may dynamically update the corresponding user profiles based on the action performed, the associated object 54, and so forth. In a further embodiment, the controller 60 may be communicatively coupled to other components of the attraction system 50, such as the prop 55, and the controller 60 may be configured to output a signal to effectuate a special effect associated with the prop 55 upon determining one of the objects 54 has appropriately gestured toward or contacted the prop 55.

Figure 2:
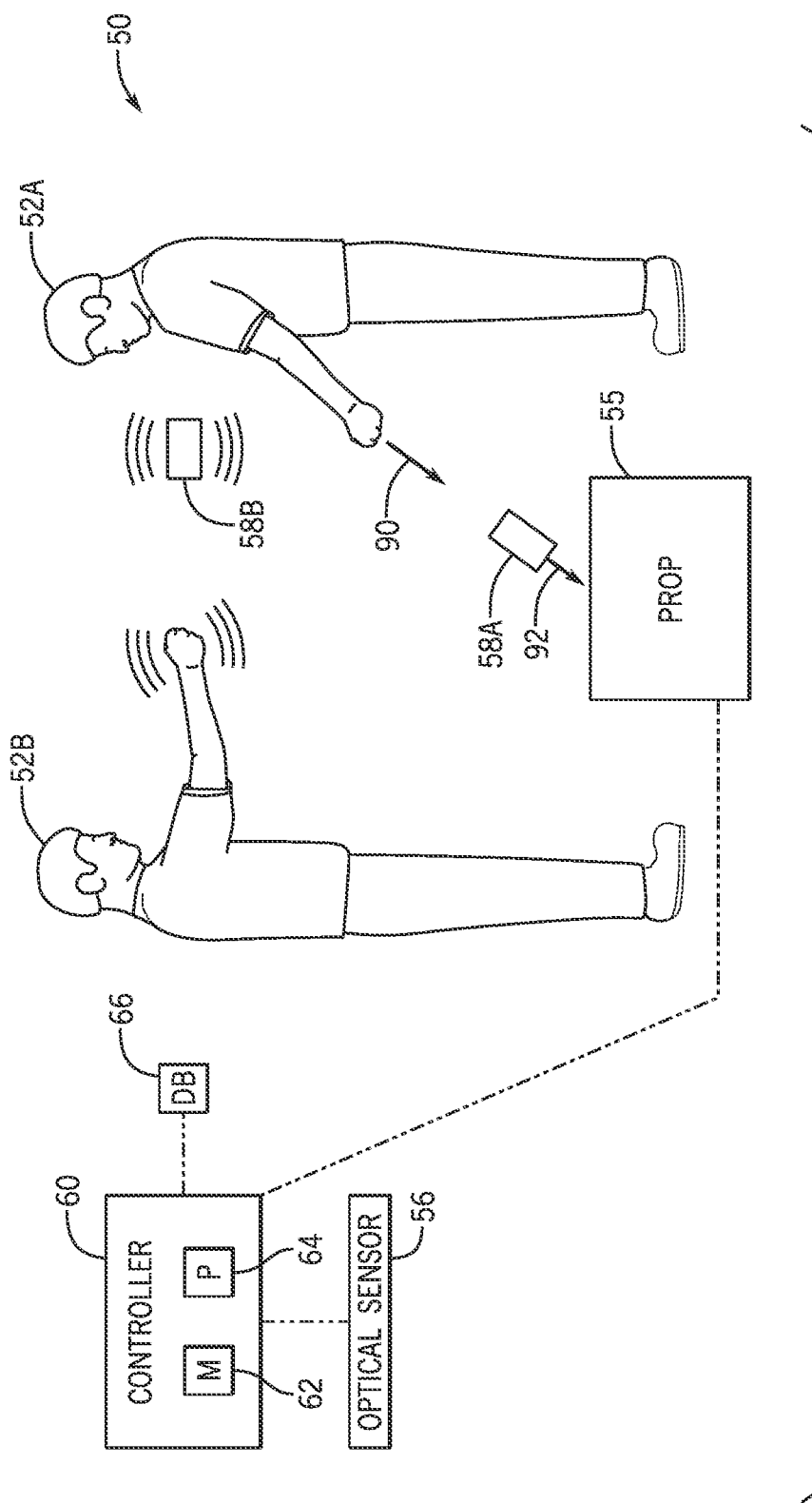
FIG. 2 is a schematic view of an attraction system having an optical sensor configured to track movement of users and objects based on respective reference elements of the objects, in accordance with an embodiment of the present disclosure.

FIG. 2 is a schematic view of an embodiment of the attraction system 50 having the optical sensor 56 configured to track movement of the users 52 and the objects 54. In the illustrated embodiment, the optical sensor 56 may detect the reference elements 58, but the optical sensor 56 may not clearly detect a remainder of the object 54 (FIG. 1). As an example, the remainder of the object 54 may not reflect light that is detectable by a filtered component of the optical sensor 56. As a result, the optical data (or a portion thereof) transmitted by the optical sensor 56 may not include image data of the remainder of the object, and the controller 60 may associate each object to a corresponding user 52 by associating each reference element 58 to the corresponding user 52 on comparing images of the users 52 with images of the reference element 58. It should be noted that image data for the user 52 may be obtained by a different optical sensor 56 or aspect than that detecting the reference element 58. In some circumstances, it may not be accurate to associate the reference elements 58 to the user 52 based on an instantaneous position of one of the users 52 and one of the reference elements 58. For example, in the illustrated embodiment, the first reference element 58A may be more proximate to the second user 52B than to the first user 52A, and the second reference element 58B may be more proximate to the first user 52A than to the second user 52B. Thus, by associating each object 54 with the user 52 of closest proximity, the controller 60 may inaccurately associate the first reference element 58A with the second user 52B and, likewise, the second reference element 58B with the first user 52A.

For this reason, instead of using instantaneous image data (e.g., representing a single point in time), the controller 60 may use multiple image data to associate each reference element 58 with the corresponding user 52. In this way, the controller 60 may determine the movement of each user 52 and the movement of each reference element 58 to correlate the users 52 and the reference elements 58 with one another. By way of example, the controller 60 may determine a movement of one of the users 52, determine a movement of one of the reference elements 58, and determine whether there is a correlation between the movement of the user 52 and the movement of the reference element 58.

In one example, the controller 60 may determine the first user 52A is moving in a first direction 90 (e.g., toward the prop 55). The controller 60 may also determine that the first reference element 58A is moving in a second direction 92 that is substantially similar to the first direction 90 and that the second reference element 58B is moving in a vibrational or oscillatory manner. Thus, the controller 60 may determine that the first reference element 58A is moving in a correlative manner with respect to the first user 52A and that the second reference element 58B is not moving in a correlative manner with respect to the first user 52A. Accordingly, the controller 60 may determine that the first reference element 58A is associated with the first user 52A, even though the second reference element 58B may be located more proximate to the first user 52A than the first reference element 58A is located relative to the first user 52A. Moreover, the controller 60 may determine that the second user 52B is exhibiting similar vibrational or oscillatory motion (e.g., an arm of the first user 52B is shaking) as that of the second reference element 58B. Therefore, the controller 60 may accurately associate the second reference element 58B with the second user 52B.

Figure 3:
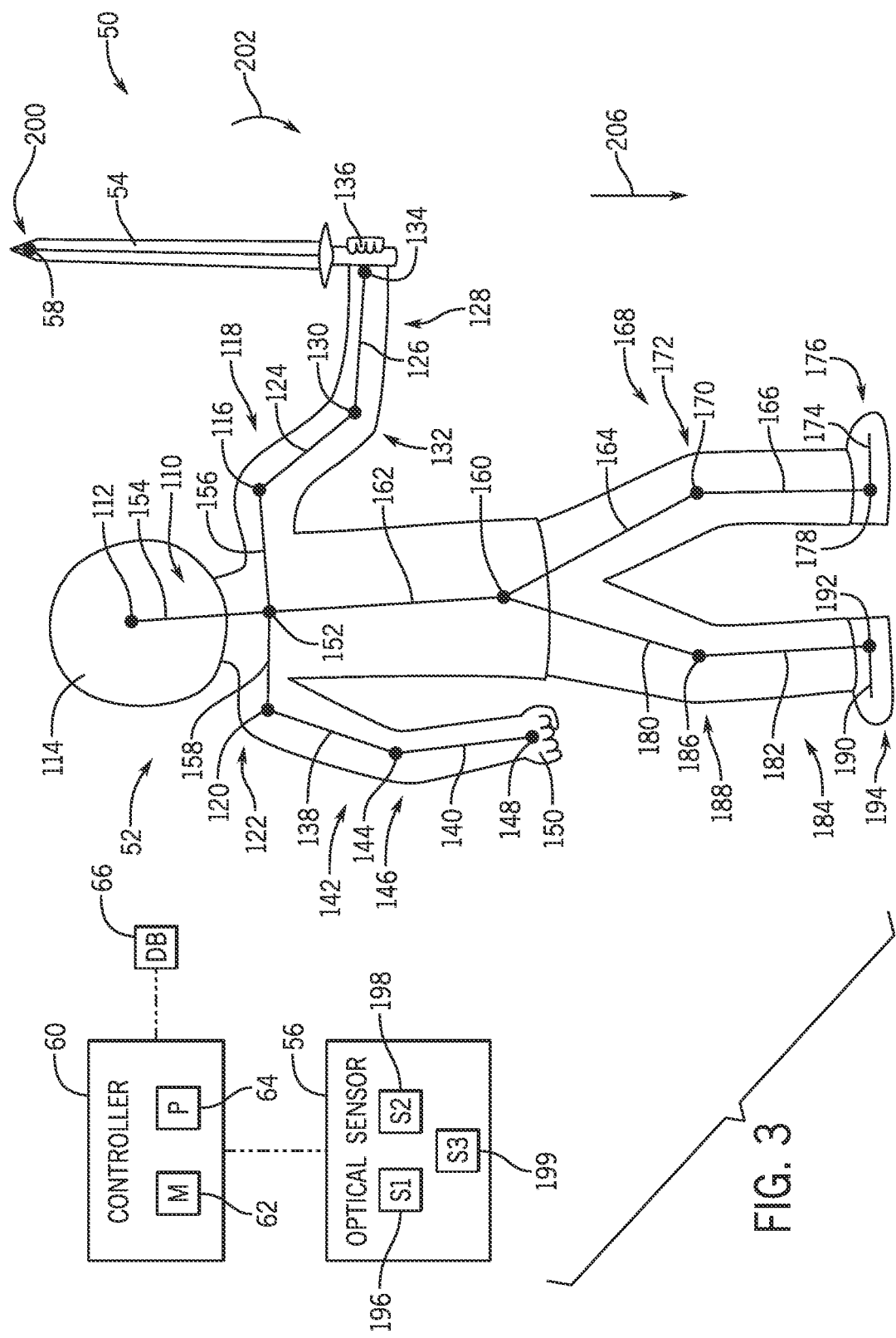
FIG. 3 is a schematic view of an attraction system illustrating a user and imagery associated with the user as detected by an optical sensor, in accordance with an embodiment of the present disclosure.

FIG. 3 is a schematic view of an embodiment of the attraction system 50 illustrating the user 52 and imagery 110 (e.g., a single or multiple images) of the user 52 as may be detected by the optical sensor 56. In the illustrated embodiment, the imagery 110 represents a skeletal structure of the user 52 at a single point in time, as may be determined from visual data and an algorithm or model (e.g., a physical feature recognition algorithm) for identifying the skeletal structure or aspects of a body (e.g., a human body) in motion. The optical sensor 56 may transmit optical data indicative of the imagery 110 to the controller 60. As the user 52 moves, the imagery 110 changes positioning accordingly, and the optical data transmitted by the optical sensor 56 is indicative of the changing imagery 110 and repositioning of the skeletal structure.

As shown in FIG. 3, the imagery 110 includes a plurality of points and line segments to represent the skeletal structure of the user 52. Using techniques for identifying skeletal structures from image data, these points and line segments may be identified and correlated to human features. Indeed, the points may generally represent various joints and other features of the user 52 and the line segments may connect each point to one another. For example, the imagery 110 includes a first point 112 that may represent a head 114 of the user 52. The imagery 110 may further include a second point 116 representing a first shoulder or arm joint 118 and a third point 120 representing a second shoulder or arm joint 122 of the user 52. A first line segment 124 and a second line segment 126 extend from the second point 116 to represent a first arm 128 of the user 52, and the first and second line segments 124, 126 connect with one another at a fourth point 130 representing a third arm joint (e.g., a first elbow) 132 of the user 52. The second line segment 126 is also connected to a fifth point 134, which may represent a first hand 136 of the user 52. Similarly, a third line segment 138 and a fourth line segment 140 extend from the third point 120 to represent a second arm 142 of the user 52, and the third and fourth line segments 138, 140 are connected with one another at a sixth point 144 representing a fourth arm joint (e.g., a second elbow) 146 of the user 52. The fourth line segment is connected to a seventh point 148 representing a second hand 150 of the user 52. Moreover, the first point 112, the second point 116, and the third point 120 may each be connected to an eighth point 152 (e.g., a chest of the user 52) via a fifth line segment 154, a sixth line segment 156, and a seventh line segment 158, respectively.

The eighth point 152 may further be connected to a ninth point 160 (e.g., a waist of the user 52) via an eighth line segment 162. A ninth line segment 164 and a tenth line segment 166 may extend from the ninth point 160 to represent a first leg 168 of the user 52, and the ninth line segment 164 and the tenth line segment 166 may be connected to one another at a tenth point 170, which may represent a first leg joint (e.g., a first knee) 172 of the user 52. An eleventh line segment 174, which may represent a first foot 176 of the user 52, may be connected to the tenth line segment 166 at an eleventh point 178. Additionally, a twelfth line segment 180 and a thirteenth line segment 182 may extend from the ninth point 160 to represent a second leg 184 of the user 52, and the twelfth line segment 180 and the thirteenth line segment 182 may be connected to one another at a twelfth point 186, which may represent a second leg joint (e.g., a second knee) 188 of the user 52. A fourteenth line segment 190 may be connected to the thirteenth line segment 182 at a thirteenth point 192, and the fourteenth line segment 190 may represent a second foot 194 of the user 52.

In an embodiment, the controller 60 may be configured to associate parts of the imagery 110 with corresponding features of the user 52. For instance, the controller 60 may apply the physical feature algorithm to the optical data received from the optical sensor 56 to determine that the first point 112 is associated with a part of the head of the user 52, that the third point 120, the third line segment 138, the fourth line segment 140, the sixth point 144, and the seventh point 148 are associated with the second arm 142 of the user, that the sixth point 144 is associated with the fourth arm joint 146 of the second arm 142, and so forth. In this way, the controller 60 may better recognize how the user 52 is moving (e.g., which body features of the user 52 are in motion) to determine whether movement of the reference element 58 is caused by movement of the user 52. For example, in certain postures of the user 52, particular parts of the imagery 110 (e.g., the ninth line segment 164 of the first leg 168 and the first line segment 124 of the first arm 128) may cross one another or become closely aligned with one another (e.g., the user 52 is bending over to tie their shoes). As a result, it may be difficult to distinguish which part of the user 52 is represented by such portions of the imagery 110 in such postures of the user 52. However, using the physical feature recognition algorithm, the controller 60 may assign the parts of the imagery 110 with body features of the user 52 and may be able to distinguish the parts of the imagery 110 regardless of or for certain postures or orientations of the user 52. Thus, if the user 52 is crossing the first arm 128 with the second arm 142 such that the first line segment 124 and the third line segment 138 traverse and overlap with one another and the seventh point 148 is positioned adjacent to the fourth point 130, the controller 60 may continue to determine that the first line segment 124 is associated with the first arm 128, the third line segment 138 is associated with the second arm 142, the fourth point 130 is associated with the third arm joint 132, the seventh point 148 is associated with the second hand 150, and so forth. Thus, the controller 60 may continue to determine the positioning of the user 52.

Although the imagery 110 has been described herein as having a particular number of points and line segments connecting the points together, an additional or alternative embodiment may include an imagery 110 having any other suitable number of points and line segments to represent the skeletal structure of the user 52. As an example, an alternative imagery may have fewer points and line segments than the imagery 110 shown with reference to FIG. 3, or an alternative imagery may have additional points and line segments (e.g., to represent individual fingers of the user 52).

Furthermore, it should be noted that the optical sensor 56 may include separate sensors configured to track the user 52 and to track the reference element 58 independently of one another, so as to avoid interference between image data of the user 52 and image data of the reference element 58. For instance, the optical sensor 56 does not associate the reference element 58 with the imagery 110, and does not associate parts of the imagery 110 with objects 54. To this end, the optical sensor 56 may include a first sensor 196, such as an RGB camera, a depth camera, a light detection and ranging (LIDAR) sensor, another suitable position sensor, or any combination thereof that is particularly configured to track the imagery 110 of the user 52. Additionally, the optical sensor 56 may include a second sensor 198, such as an infrared sensor, that is particularly configured to track the reference element 58. For this reason, the reference element 58 may emit (e.g., initiate or reflect) a signal or other indication that is detectable by the second sensor 198 and not the first sensor 196 to distinguish the reference element 58 more effectively from other features (e.g., the user 52, other sources of light). By way of example, the reference element 58 may include a retroreflective material that is filtered to reflect light (e.g., infrared light) having a wavelength within a limited bandwidth, and the second sensor 198 may be filtered to detect light having a wavelength within the limited bandwidth and not light having a wavelength within other bandwidths. As such, the optical sensor 56 may distinguish the reference element 58 from other features that may reflect light having a wavelength outside of the limited bandwidth. In a certain embodiment, the respective reference elements 58 of each object 54 may be unique from one another. By way of example, each reference element 58 may have a particular characteristic, such as a particular shape or a reflected light of a particular wavelength, to enable the controller 60 to distinguish the reference element 58 from other reference elements 58. In this manner, the controller 60 may distinguish different objects 54 from one another and may provide a unique experience based on the particularly determined object 54.

Moreover, the controller 60 may be configured to distinguish different users 52 from one another based on the respective imagery 110. In an embodiment, based on the positioning of each point, the length of each line segment, and the like for each respective imagery 110, the controller 60 may distinguish different imagery 110 from one another. In this manner, the controller 60 may be able to associate a particular imagery 110 (e.g., having specific characteristics) with each user 52 in the attraction system 50 and accurately determine which user 52 is performing an action. This may include analysis of a series of the imagery 110 to discern likely human movements and correlative movements of the reference element 58. For example, if the reference element 58 is determined to be shaking back and forth and a wrist of a user 52 is determined to be flicking in a correlative fashion, an association between the reference element 58 and of the wrist of the user 52 may be made. Data stored in the database 66 and/or established via machine learning or artificial intelligence may be employed to discern such relationships. In an additional or an alternative embodiment, the controller 60 may also be configured to recognize facial features of users 52. To this end, the optical sensor 56 may also include a third sensor 199 (or simply employ a same sensor) configured to transmit optical data indicative of facial features, such as eye color, nose position, spacing between eyes, complexion, and the like, of each user 52 to the controller 60. The controller 60 may then apply a facial recognition algorithm to identify unique facial features and to assign particular users 52 to corresponding unique facial features, such as to assign a particular facial imagery to each imagery 110, further enabling the controller 60 to distinguish users 52 from one another.

The controller 60 may identify the positioning of the points and line segments of the imagery 110 to determine whether a certain reference element 58 is associated with the user 52. In an embodiment, the controller 60 may apply a body mechanics algorithm to the optical data received from the optical sensor 56 to determine whether movement of the user 52 correlates with movement of the reference element 58. In the illustrated example, the object 54 is a sword having an elongate or elongated shape, and the reference element 58 is positioned at a tip 200 of the object 54. In an additional or an alternative example, the object 54 may have any suitable shape, such as spherical shape, and/or the reference element 58 may be positioned at any suitable location of the object 54 to enable the optical sensor 56 and the controller 60 to cooperate and track positioning of the reference element 58.

The object 54 is held in the first hand 136 of the user 52 in the illustrated implementation, but it should be noted that the object 54 may be attached or possessed by the user 52 in any suitable manner. With reference to FIG. 3, when any part of the first arm 128 (e.g., the first arm joint 118 and/or the third arm joint 132) moves, the reference element 58 may move as well. The body mechanics algorithm may be used to determine if movement of the imagery 110 (e.g., of the first point 112, the first line segment 124, the second line segment 126, the fourth point 130, the fifth point 134) representing the first arm 128 corresponds to movement of the reference element 58. As an example, the controller 60 may determine, via the physical feature recognition algorithm, that the fifth point 134 is associated with the first hand 136 of the user 52. The controller 60 may also determine that, based on a positioning of the reference element 58 and the fifth point 134, such as a distance between the reference element 58 and the fifth point 134, a movement of the fifth point 134 and the reference element 58, and the like, the user 52 is holding the object 54 in the first hand 136.

As another example, the controller 60 may determine that the fifth point 134 is rotating in a rotational direction 202 about the fourth point 130 (e.g., the user 52 is pivoting the first hand 136 about the third arm joint 132) and that the reference element 58 is also moving in the rotational direction 202. The controller 60 may then apply the body mechanics algorithm to determine whether the rotational movement of the fifth point 134 is correlated with the rotational movement of the reference element 58, such as based on a radius of each arc associated with the respective rotation of the fifth point 134 and the reference element 58, an angle of the rotation of the fifth point 134 and the reference element 58, a distance between the fifth point 134 and the reference element 58, and so forth. Therefore, if the first user 52A is primarily moving their first and second legs 168, 184 (e.g., walking) and not their first and second arms, 128, 142, and the second user 52B is moving their first arm 128 to cause movement of the fifth point 134, then the controller 60 may determine that the reference element 58 is associated with the second user 52B.

Moreover, the controller 60 may determine whether the user 52 is no longer holding the object 54 with the first hand 136. As a further example, the controller 60 may determine that movement of the first arm 128 of the user 52 no longer affects the movement of the reference element 58. However, the controller 60 may determine that movement of the second arm 142 of the user 52 is correlated with the movement of the reference element 58. As a result, the controller 60 then determines that the user 52 is holding the object 54 in the second hand 150.

The controller 60 may also use the body mechanics algorithm to determine whether movement of other parts of the imagery 110 correlates with movement of the reference element 58. The body mechanics algorithm may correlate movements to body characteristics and movement sequences. Correlations may be based on established arm motions relative to a body and associated geometry, such as treating an arm length like a radius of a sphere with a shoulder (e.g., the first or second arm joint 118, 122) being a center point. In one example, the user 52 may crouch, thereby bending the first and second legs 168, 184. The controller 60 may determine such movement of the user 52 based on a general movement of the imagery 110 in a vertical direction 206, rotation of the ninth line segment 164 about the tenth point 170, rotation of the twelfth line segment 180 about the twelfth point 186, and so forth. The controller 60 may then compare the movement of the imagery 110 with movement of the reference element 58, such as a distance moved by the reference element 58 in the vertical direction 206, to determine whether movement of the user 52 correlates with movement of the reference element 58 and the object 54.

It should be noted that the controller 60 may continue to associate the reference element 58 and the object 54 with the user 52 until the controller 60 determines the object 54 is possessed by a different user 52. For instance, the user 52 may drop the object 54. Thus, movement of the user 52 and of the imagery 110 associated with the user 52 may not cause any movement of the reference element 58. However, the controller 60 may continue to associate the reference element 58 with the user 52, despite there being no correlation in movement of the imagery 110 of the user 52 and the movement of the reference element 58. As such, even when the user 52 does not physically possess the object 54, the controller 60 may continue to update features associated with the user 52 based on the object 54, such as to assign points to the user 52 in response to interactions occurring with the object 54 (e.g., the object 54 rolls to perform a defined gesture toward a prop). However, the controller 60 may be configured to associate the object 54 with a different user upon determining the movement of the different user correlates with the movement of the reference element 58. In one example, the first user 52A (FIG. 3) may give the object 54 to the second user 52B (FIG. 3), such that the first user 52A no longer possesses the object 54, and the second user 52B possesses the object 54. As a result, the controller 60 determines that movement of the reference element 58 corresponds with movement of the second user 52B (e.g., of the imagery of the second user 52B) and not with the first user 52A. Therefore, the controller 60 may change the association of the object 54 from the first user 52A to the second user 52B. In other words, the controller 60 may update features associated with the second user 52B, instead of the first user 52A, based on interactions occurring with the object 54. Additionally or alternatively, the controller 60 may continue to associate the object 54 with the first user 52A regardless of which user possesses the object 54. In this way, even though the second user 52B may possess the object 54, such that the movement of the reference element 58 correlates with movement of the second user 52B and interactions with the object 54 are caused by the second user 52B, the controller 60 may continue to update features associated with the first user 52A as a result of the interactions associated with the object 54.

Figure 4:
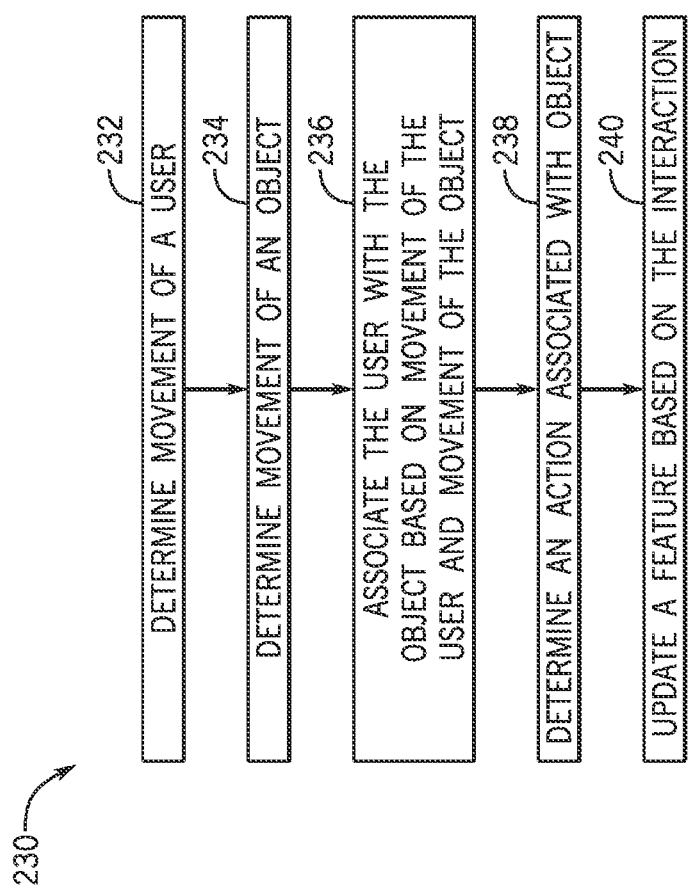
FIG. 4 is a block diagram of a method or process for updating a feature of an attraction system in response to an interaction associated with an object, in accordance with an embodiment of the present disclosure.

FIG. 4 is a block diagram of an embodiment of a method or process 230 for updating a feature of an attraction system in response to an interaction associated with an object. The method 230 may be performed by a controller, such as the controller 60 of FIGS. 1-3. However, the method 230 may be performed by any other suitable component, such as a computing device. It should also be noted that the steps of the method 230 may be performed differently than shown in FIG. 4, such as for different embodiments of the attraction system. By way of example, additional steps may be performed, and/or certain steps of the method 230 may be removed, modified, performed in a different order, and/or performed simultaneously with one another.

At block 232, the movement of a user is determined. As an example, the imagery of the user may be determined in real-time (e.g., essentially instantly) by the optical sensor, which transmits optical data indicative of the imagery. The movement of the user may be tracked using the imagery, such as based on the positioning of the points, line segments, and other associated features of the imagery. Further, a particular user may be identified. For instance, detected imagery may be evaluated and analyzed to determine unique characteristics associated with the imagery, such as via the physical feature recognition algorithm. Additionally or alternatively, facial features of the user may be evaluated and analyzed to determine unique characteristics of the facial features, such as via the facial recognition algorithm. Thus, the optical data may include distinctive information regarding the user that may enable the user to be distinguished from other users, thereby enabling a particular user to be tracked.

At block 234, which may occur concurrently with the step at block 232, the movement of an object is determined. In an embodiment, the object may include a reference element positioned on the object. Thus, determining the movement of the reference element also determines the movement of the object. Further, the reference element may include properties (e.g., a retroreflective property) that cause the reference element to be distinguishable from other features of the attraction system. As such, movement of the reference element and of the object may be more accurately tracked. In a certain embodiment, the reference element may include a unique characteristic that enables the reference element to be distinguished from other objects, thereby enabling a particular object to be tracked.

At block 236, it may be determined whether the movement of the user corresponds to the movement of the object. For example, the body mechanics algorithm may be applied to determine whether positioning in the imagery, such as a shifting of points and/or line segments, is correlated with the positioning of the reference element of the object. In a certain embodiment, it may be determined that a particular object is associated with a particular user. For example, the user may have a unique user identifier (e.g., based on a characteristic of the imagery or facial feature associated with the user), such as a user profile, and the object may have a unique object identifier (e.g., based on a unique characteristic), such as an object tag. Therefore, the unique user identifier may be associated with the unique object identifier, thereby creating a more distinctive association between the user and the object.

At block 238, an action associated with the object is determined, such as based on a positioning of the object. In one implementation, the positioning may include a particular orientation or position (e.g., coordinate position) of the object. The orientation or position of the object may indicate an action in which the object is in contact with another feature or component of the attraction system (e.g., a prop and/or another user). In another implementation, the positioning may include a particular motion or movement of the object. Such motion of the object may indicate an action in which the user is performing a certain gesture using the object (e.g., pointing toward a prop).

At block 240, in response to determining the action associated with the object has occurred, a feature of the attraction system is updated. By way of example, a special effect may be activated to provide an interactive and immersive experience for the user. In an additional or alternative implementation, information or data regarding the particular user, such as information or data stored in the database, is updated. The information may include a point value assigned to a user profile or user record associated with the particular user, and/or a point value assigned to an object record associated with the particular object, such as for an interactive game of the attraction system. Furthermore, the information may be based on the prop on which the action may be performed. For example, the attraction system may include a plurality of props, where each prop is associated with a particular update to the database, such as a particular amount of assigned point values. Thus, an action performed on a first selected prop of the plurality of props may result in a different update to the information than another action performed on a second selected prop of the plurality of props. As such, the feature may be updated based on the user, the object, the action, the selected prop, or any combination thereof, thereby creating a more personalized and unique experience for the user.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system of an attraction, the control system comprising:
   a controller configured to:
      receive optical data indicative of motions of a plurality of users and motions of a plurality of objects in the attraction;
      identify a first motion of a user of the plurality of users based on the optical data;
      identify a second motion of an object of the plurality of objects based on the optical data;
      perform a comparison of the first motion of the user and the second motion of the object; and
      determine the object is associated with the user based on a correlation between the first motion of the user and the second motion of the object as identified via the comparison of the first motion and the second motion.

2. The control system of claim 1, wherein the controller is configured to determine the object is not associated with the user based on there being no correlation between the first motion of the user and the second motion of the object as identified via the comparison of the first motion and the second motion.

3. The control system of claim 2, wherein the user is a first user, and the controller is configured to determine the object is not associated with the first user based on an identified correlation between the second motion of the object and a third motion of a second user of the plurality of users.

4. The control system of claim 1, wherein the controller is configured to apply a facial recognition algorithm to the optical data to determine an identifier of the user.

5. The control system of claim 1, wherein the controller is configured to identify a skeletal structure in the optical data and identify the first motion of the user based on movement of the skeletal structure.

6. The control system of claim 1, wherein the controller is configured to identify a third motion of the object upon determining the object is associated with the user, and the third motion comprises an interaction between the object and a prop of the attraction.

7. The control system of claim 6, wherein the controller is configured to:
   identify a user profile associated with the user in a database; and
   update the user profile based on the interaction between the object and the prop.

8. The control system of claim 6, wherein the third motion comprises contact between the object and the prop.

9. The control system of claim 1, wherein the controller is configured to identify the second motion of the object based on movement of a trackable reference element of the object indicated by the optical data.

10. A controller for an attraction system, the controller comprising a non-transitory computer readable medium storing executable instructions that, when executed by a processor of the controller, are configured to cause the processor to:
   receive data from one or more sensors of the attraction system;
   analyze the data to detect a first motion of a user of a plurality of users in the attraction system and a second motion of an object of a plurality of objects in the attraction system;
   determine the object is possessed by the user based on a determination that there is a correlation between the first motion and the second motion; and
   determine the object is not possessed by the user based on a determination that there is insufficient correlation between the first motion and the second motion.

11. The controller of claim 10, wherein the instructions, when executed by the processor, are configured to cause the processor to identify the second motion of the object based on a positioning of an object tag of the object as indicated by optical data from the one or more sensors of the attraction system.

12. The controller of claim 10, wherein the instructions, when executed by the processor, are configured to cause the processor to:
   analyze the data to detect a third motion of an additional user of the plurality of users;
   determine the object is possessed by the additional user based on a determination that there is a correlation between the second motion and the third motion; and determine the object is not possessed by the additional user based on a determination that there is insufficient correlation between the second motion and the third motion.

13. The controller of claim 10, wherein the instructions, when executed by the processor, are configured to cause the processor to:
analyze the data to detect a third motion of an additional object of the plurality of objects;
determine the additional object is possessed by the user based on a determination that there is a correlation between the first motion and the third motion; and
determine the additional object is not possessed by the user based on a determination that there is insufficient correlation between the first motion and the third motion.

14. The controller of claim 10, wherein the instructions, when executed by the processor, are configured to cause the processor to:
analyze the data to detect a third motion of an additional user of the plurality of users and a fourth motion of an additional object of the plurality of objects;
determine the additional object is possessed by the additional user based on a determination that there is a correlation between the third motion and the fourth motion; and
determine the additional object is not possessed by the additional user based on a determination that there is insufficient correlation between the third motion and the fourth motion.

15. An attraction system of an amusement park, the attraction system comprising:
a database configured to store optical data detected by one or more sensors and a plurality of profiles associated with respective users; and
a controller communicatively coupled to the database, wherein the controller is configured to:
receive the optical data via the database;
process the optical data to detect movement of a plurality of users and movement of a plurality of objects in the attraction system;
identify a first motion of a user of the plurality of users based on the optical data;
identify a second motion of an object of the plurality of objects based on the optical data;
perform a comparison of the first motion of the user and the second motion of the object;
determine the object is associated with the user based on a correlation between the first motion of the user and the second motion of the object as identified via the comparison of the first motion and the second motion;
determine an identifier of the user;
select a profile from the plurality of profiles stored in the database based on the identifier of the user; and
update the profile based on the second motion and the association between the object and the user.

16. The attraction system of claim 15, wherein the controller is configured to:
identify a third motion of an additional user of the plurality of users based on the optical data;
identify a fourth motion of an additional object of the plurality of objects based on the optical data;
perform a comparison of the third motion of the additional user and the fourth motion of the additional object; and
determine the additional object is associated with the additional user based on a correlation between the third motion of the additional user and the fourth motion of the additional object as identified via the comparison of the third motion and the fourth motion.

17. The attraction system of claim 16, wherein the controller is configured to:
determine an additional identifier of the additional user;
select an additional profile from the plurality of profiles stored in the database based on the additional identifier of the additional user;
identify a fifth motion of the object indicative of an interaction between the user and the additional user via the object; and
update the profile, the additional profile, or both, based on identification of the fifth motion.

18. The attraction system of claim 15, wherein the controller is configured to:
identify a third motion of the user based on the optical data after identifying the first motion of the user;
identify a fourth motion of the object based on the optical data after identifying the second motion of the object;
perform a comparison of the third motion of the user and the fourth motion of the object; and
determine the object is no longer associated with the user based on a determination that there is no correlation between the third motion of the user and the fourth motion of the object as identified via the comparison of the third motion and the fourth motion.

19. The attraction system of claim 15, comprising the object, wherein the object comprises a trackable reference element with a retroreflective material that is configured to reflect light having a wavelength within a limited bandwidth, and the controller is configured to identify the second motion of the object based on positioning of the trackable reference element as indicated by the optical data.

20. The attraction system of claim 15, comprising the one or more sensors, wherein the one or more sensors comprises one or more cameras.

* * * * *